United States Patent [19]

Tsuchiya et al.

[11] Patent Number: 4,660,939
[45] Date of Patent: Apr. 28, 1987

[54] ELECTROCHROMIC DISPLAY DEVICE

[75] Inventors: Sohji Tsuchiya, Kanagawa; Wataru Fujikawa, Kawasaki; Toshikuni Kojima, Kawasaki; Sadashi Higuchi, Kawasaki; Akio Yamashita, Kanagawa, all of Japan

[73] Assignee: Matsushita Electric Industrial Co., Ltd., Osaka, Japan

[21] Appl. No.: 647,490

[22] Filed: Sep. 5, 1984

[30] Foreign Application Priority Data

Sep. 8, 1983 [JP] Japan ................................ 58-165506
Dec. 23, 1983 [JP] Japan ................................ 58-246068
Jun. 8, 1984 [JP] Japan ................................ 59-118466

[51] Int. Cl.$^4$ ............................................. G02F 1/01
[52] U.S. Cl. .................................................. 350/357
[58] Field of Search ......................................... 350/357

[56] References Cited

U.S. PATENT DOCUMENTS 3,712,710  1/1973  Castellion et al. ................. 350/357

FOREIGN PATENT DOCUMENTS 0040478  3/1980  Japan ................................ 350/357
0139129  8/1983  Japan ................................ 350/357

Primary Examiner—Bruce Y. Arnold
Attorney, Agent, or Firm—Spencer & Frank

[57] ABSTRACT

In an electrochromic display device including a pair of opposed substrates, a display electrode formed on one of the substrates and a counter electrode formed on the other substrate, the response speed and display life of the device are improved by its novel counter electrode structure including a low conductive film arranged to face the display electrode and a high conductive film arranged to uncover, adjoin or cover the former. Alternatively, the low conductive film is embedded in the high conductive film to face the display electrode. Each of the conductive films is essentially made of $In_2O_3$, $In_2O_3$—$SnO_2$ or $SnO_2$. The high conductive film may be made of Au, Ag or Pt. Where the low conductive film is an insulating film, it is sandwiched by the high conductive films. The insulating film is made of a metal oxide, metal fluoride or metal nitride. The difference in electric resistance between the low and high conductive films is selected 10 times or more. This novel counter electrode structure reduces the leakage current and provides a uniform current density distribution thus ensuring an improved response speed and display life.

15 Claims, 15 Drawing Figures

ELECTROCHROMIC DISPLAY DEVICE

BACKGROUND OF THE INVENTION

The present invention relates to an electrochromic display device used in a variety of display applications for timepieces, measuring instruments, household electric appliance, etc.

In contrast to the liquid crystal display, the electrochromic display features a wide-viewing angle, bright color and a high degree of definition. The well known inorganic electrochromic material is tungsten oxide or WO$_3$. The most well known organic electrochromic material is viologen, and other coloring materials such as pyrazolines, anthraquinones and the like are also known.

The device is made by forming a thin film of WO$_3$ on each of a pair of transparent electrodes by evaporation or the like and providing an electrolyte or a dielectric film between the opposed electrodes. From a practical point of view, the use of WO$_3$ is disadvantageous in that the display life is short, there are variations in color among the different display segments and only a single kind of coloration color or bluish color is possible. There are other disadvantages in that the material of the opposed electrodes can react and a reflecting plate or the like must be incorporated in the device.

On the other hand, while the organic coloring materials have the possibility of ensuring various kinds of coloration colors as compared with the inorganic materials, generally they also suffer the problem of display life. The organic coloring material of the viologen type produces color by reduction and returns to the bleached state upon its oxidation. The coloring material of the viologen type has the disadvantage of a short display life. The reason is that since the colored coloring material becomes insoluble to the solvent, the coloring material exhibits both solubility and insolubility phenomena in accordance with its bleaching and coloration and this reversability is responsible for its short life. Also, since the ions take part in these oxidation and reduction reactions, these ions produce a detrimental effect on the transparent electrodes in some cases and there is also the disadvantage of a large power consumption. It will thus be seen that the existing electrochromic display has disadvantages in terms of the display life and response speed characteristics over the liquid crystal display.

Generally, the electrochromic display device is constructed so that the display electrode is formed on one of a pair of glass substrates and a counter electrode is formed on the other glass substrate with an electronic material being sealed between the electrodes. It is only necessary that at least one of the glass substrates be made of a transparent material. Suitable electrode materials for the display electrode and the counter electrode include such transparent electrodes as In$_2$O$_3$ and SnO$_2$. The area of the display electrode is smaller than that of the counter electrode. Epoxy resin, low melting point glass, solder or the like is used as a sealing material and filling material. A display producing substance is a solution prepared by dissolving a coloring material such as styryl type analogous compound and a supporting electrolyte in a non-aqueous organic solvent. With this construction, while the display life of the device is determined by some factors such as the impurities included in the display producing substance, one of the factors is a change of the properties of the counter electrode material by an electrochemical reaction. In other words, since each of the display electrode and the counter electrode is made of a transparent electrode of a metal oxide such as In$_2$O$_3$, it tends to be subjected to a reduction reaction so that the reduction reaction causes the elimination of oxygen atoms and hence oxidation of the ingredients in the solution thereby causing a detrimental effect on the display life. The electrodes tend to undergo the reaction more with an increase in the current value. In particular, the change of the properties of the counter electrode is a problem.

The change of properties of the counter electrode is particularly severe in the portion facing the display electrode so that the reduction occurs materially and the display life is deteriorated greatly.

To overcome this drawback, it has recently been proposed to form an insulating film on the portion of the counter electrode facing the display electrode. While this has the effect of decreasing the amount of current flow to the counter electrode and thus improving the display life to some extent, the effect is still insufficient.

Further, where a dc voltage is applied across the display electrode and the counter electrode of the electrochromic display device in a manner that the display electrode becomes positive, there is a disadvantage that a longer time is required before the coloration density reaches a saturation state and thus the response speed is low.

SUMMARY OF THE INVENTION

With a view to overcoming the foregoing deficiencies in the prior art, it is an object of the present invention to provide an electrochromic display device which is improved in response speed and display life.

In accordance with the invention there is thus provided an electrochromic display device including a pair of opposed substrates at least one of which is transparent, a display electrode provided on one of the substrates, and a counter electrode provided on the other substrate and composed of a low electrically conductive film and a high electrically conductive film.

Where the low electrically conductive film is an insulating film, it is preferable that the insulating film is held between high electrically conductive films in the form of a sandwich structure.

BRIEF DESCRIPTION OF THE DRAWINGS

The same component parts are designated by the same reference numerals throughout the drawings.

DESCRIPTION OF THE PREFERRED EMBODIMENTS

Before describing the embodiments of the invention, a prior art electrochromic display device will be described with a view to facilitating the understanding of the invention.

Figure 1:
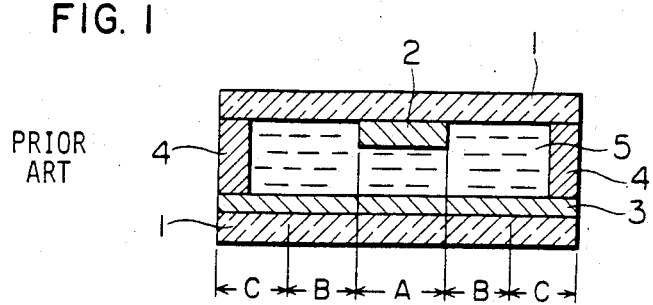
FIG. 1 is a sectional view of a prior art electrochromic display device.

FIG. 1 shows an example of the prior art electrochromic display device. Numeral 1 designates a pair of glass substrates, 2 a display electrode, 3 a counter electrode, 4 a sealing material and 5 a display producing substance. At least one of the glass substrates is transparent. The suitable electrode materials for the display electrode 2 and the counter electrode 3 include transparent electrodes made of $In_2O_3$, $SnO_2$, etc. The display electrode 2 is smaller in area than the counter electrode 3. An epoxy resin, low melting point glass or solder is used for the sealing material. The display producing substance 5 is a solution prepared by dissolving a coloring material including an electrochromic material and a supporting electrolyte in a nonaqueous organic solvent.

With the electrochromic display device constructed as described above, the display life is affected considerably by the change of properties of the counter electrode 3 due to the reduction as mentioned previously. A study of the current density distribution of the counter electrode 3 has shown that where the counter electrode 3 is divided into areas A, B and C as shown in FIG. 1, the ratio of the current in the area A to the total current is 70%, the ratio of the area B is 20% and the ratio of the area C is about 10%. Thus, the area A is greatly reduced by its large current density and the display life is deteriorated.

Figure 2A:
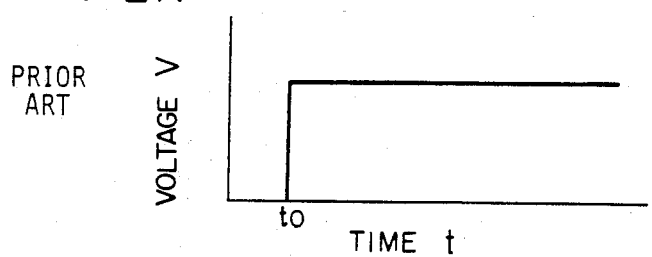
FIGS. 2A, 2B and 2C are graphs showing respectively the variation with time of the applied voltage, coloration density and current of the electrochromic display device shown in FIG. 1.
Figure 2B:
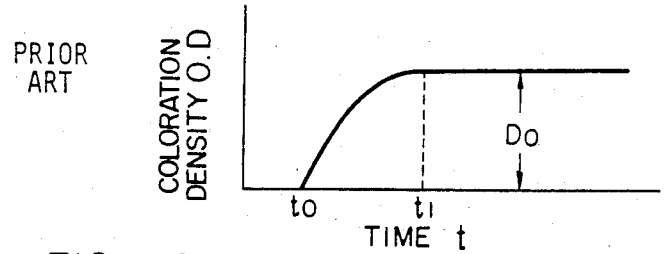
Figure 2C:
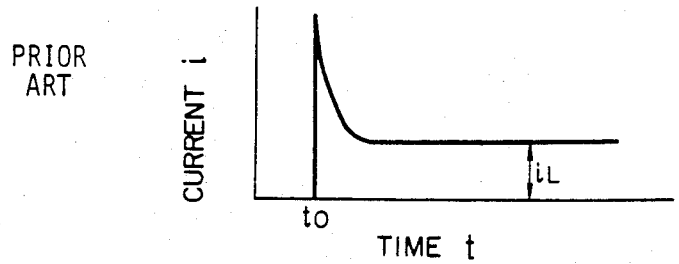

FIGS. 2A to 2C show the variation with time of the applied voltage, coloration density O.D and current i in a case where a dc voltage $V_1$ is applied across the display electrode 2 and the counter electrode 3 in a manner that the display electrode 2 becomes positive. FIG. 2A shows the variation of the applied voltage, FIG. 2B the variation of the coloration density with time and FIG. 2C the variation of the current value with time. It is essential that in FIG. 2B the time $t_1$ required for the coloration density to attain the saturated value $D_0$ is decreased thereby increasing the response speed. Another disadvantage is that the value $i_L$ of the current flow in the electrochromic display device is large and thus the coloration density $D_0$ is low.

Figure 3:
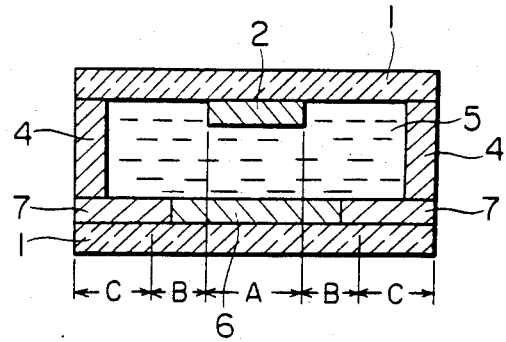
FIGS. 3 to 5 are sectional view of electrochromic display devices according to different embodiments of the invention.

FIG. 3 is a sectional view of an electrochronic display device according to an embodiment of the invention.

In the Figure, numeral 1 designates a pair of glass sheets, 2 a display electrode including a transparent electrode of $In_2O_3$ or $SnO_2$, 4 a sealing material including an epoxy resin, low melting glass, solder or the like, and 5 a display producing substance composed of a solution including an electrochromic material or a combination of an electrochromic film formed on the surface of the display electrode 2 and an electrolyte. The present embodiment features the construction of the counter electrode. More specifically, the counter electrode includes an electrode 6 made of a low electrically conductive material and an electrode 7 made of a high electrically conductive material, and the electrode 6 which is made of the low conductive material and greater in area than the display electrode 2 is positioned on the glass sheet 1 opposing the display electrode 2 so as to include the area of the display electrode 2. The electrodes 7 of the high conductive material adjoins the periphery of the electrode 6 made of the low conductive material. The low conductive material is composed of a metal oxide such as $In_2O_3$ or $SnO_2$ and the high conductive material is composed of a metal. The metal may be Au, Ag, Pt, Cu or Ab. With this counter electrode structure, the ratio of the current in the area A is reduced to 50% or less and the concentrated change of properties of the electrode in the area A is decreased and the display life is increased. It is advantageous to place the electrode 7 of the high conductive material in a region whih is not seen by the viewer.

Figure 4:
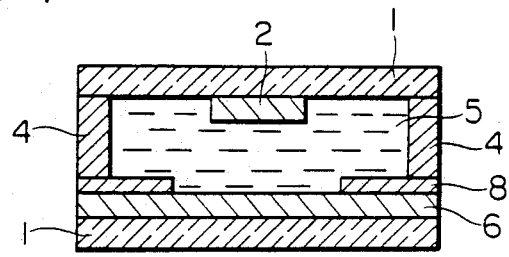

FIG. 4 is a sectional view of an electrochromic display device according to a second embodiment of the invention. This embodiment is identical in construction with the first embodiment except for the construction of its counter electrode. In other words, the counter electrode includes an electrode 6 made of a low conductive material and formed on the glass sheet 1 and an electrode 8 made of a high conductive material and formed on an area other than the area containing the display electrode 2 including just below the display electrode 2. In this case, it is also possible to ensure a uniform current density distribution in the counter electrode and thereby prevent deterioration of the display life due to the localized change of properties of the counter electrode in the like manner as the first embodiment.

Figure 5:
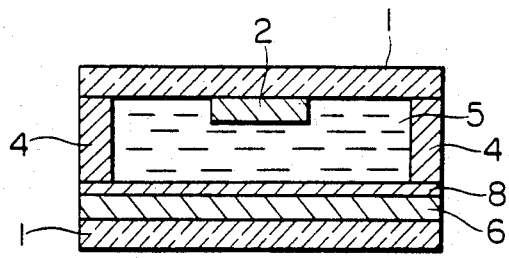

FIG. 5 is a sectional view showing an electrochromic display device according to a third embodiment of the invention. In this embodiment, an electrode 8 of a high conductive material is formed over the whole surface of an electrode 6 of a low conductive material and this embodiment produces the same effect as the previously mentioned first and second embodiments.

Also, in all of the first to third embodiments, the rise of the coloration density shown in FIG. 2B is increased and the time $t_1$ is decreased.

Figure 6A:
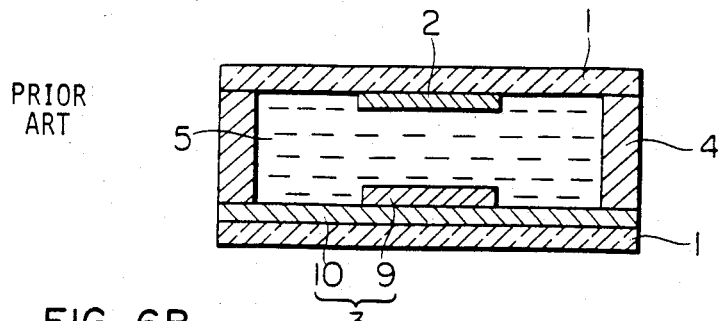
FIG. 6A is a side sectional view of an electrochromic display device according to the prior art.
Figure 6B:
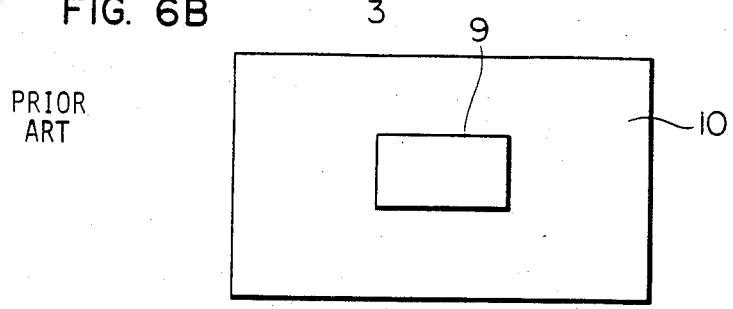
FIG. 6B is a plan view of the counter electrode in the electrochromic display device of FIG. 6A.

FIGS. 6A and 6B show the construction of a prior art electrochromic display device. FIG. 6A is a side sectional view of the device and FIG. 6B is a plan view of its counter electrode.

In the Figures, numeral 1 designates transparent substrates made of glass or the like, 2 a display electrode, 3 a counter electrode, 4 a sealing material, and 5 a display producing substance. This embodiment features that each of the display electrode 2 and the counter electrode 3 is composed of a transparent electrode and that the counter electrode 3 includes two conductive films of different electric resistances, i.e., a first conductive film 9 and a second conductive film 10.

The display producing substance 5 sealed into the display device includes a solution having the following composition.

The electrochromic material is composed of one of styryl analogous compound coloring materials, i.e., 3,3-dimethyl-2-(P-dimethyl-aminostyryl)-indolyno[1,2-b]-oxyazoline (abbreviated as IRPDM) and this material and a supporting electrolyte composed of tetrabutyl ammonium perchlorate are respectively dissolved to densities of 0.3M/l and 0.3M/l in a solution of propylene carbonate. The IRPDM is colorless when no electric stimulus is applied to it and it is responsive to the application of an electric stimulus to produce red color having a peak absorbance at around 550 nm.

Experiments have been conducted on the following three kinds of counter electrodes including those in which the first conductive film 9 of the counter electrode 3 is a film of $SnO_2$ or $In_2O_3$—$SnO_2$ (ITO) and the second conductive film 10 is made of $In_2O_3$—$SnO_2$ (ITO) and one in which the first and second conductive films 9 and 10 are the same films of ITO. The conditions of the experiments are shown in the following Table 1.

In this case, it is assumed that the area of the first conductive film 9 is all the same or slightly over-sized as compared with that of the display electrode 2 and positioned opposite thereto. The area ratio of the display electrode 2 to the counter electrode 3 is assumed to be $\frac{1}{2}$ or more.

TABLE 1

| Display device | First conductive film | | Second conductive film | |
|---|---|---|---|---|
| No. 1 | ITO | 100 Ω/□ | ITO | 100 Ω/□ |
| No. 2 | $SnO_2$ | 1 KΩ/□ | ITO | 100 Ω/□ |
| No. 3 | $SnO_2$ | 10 KΩ/□ | ITO | 100 Ω/□ |

The dc voltage shown in FIG. 2A having a magnitude of 1.3 V was applied to each of these three kinds of display devices for 3 minutes and then three current values $i_L$ and coloration densities in terms of the light absorption constants at 550 nm were measured. Also, their display lives were examined by subjecting them to a continuous application test of 1.3 V at 60° C. The resulting characteristics are shown in Table 2.

TABLE 2

| Display device | Current value $i_L$ | Light absorption constant (550 nm) | Display life |
|---|---|---|---|
| No. 1 | 30 μA/cm² | 30% | <1000H |
| No. 2 | 20 μA/cm² | 40% | ~1000H |
| No. 3 | 5 μA/cm² | 60% | >2000H |

Figure 7A:
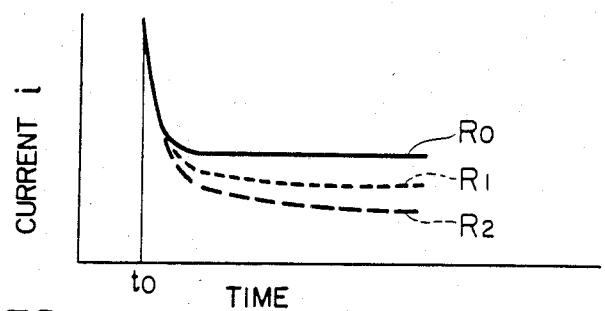
FIGS. 7A and 7B are respectively the current-time characteristic diagram and coloration density-time characteristic diagram obtained in a case where the electric resistance of the second conductive film is fixed and the electric resistance of the first conductive film is increased gradually in the electrochromic display of FIG. 6A.
Figure 7B:
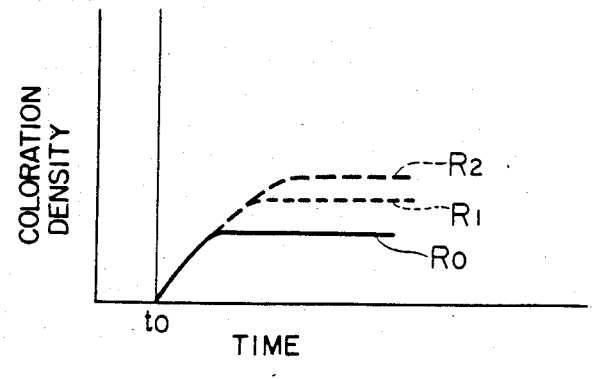

When the electric resistance of the first conductive film 9 is increased from the conventional value of $R_0$ (No. 1) which is equal to that of the second conductive film 10 to $R_1$ (No. 2) and then to $R_2$ (No. 2), the current-time characteristic and the coloration density-time characteristic become as shown in FIGS. 7A and 7B, respectively. In other words, the leakage current $i_L$ is decreased but the coloration density is increased with a increase in the electric resistance of the first conductive film 9. The characteristics of the display device show a desirable tendency from the standpoint of power consumption and coloration contrast. While the current value is minimized and the coloration density is increased if the electric resistance of the conductive film 9 is in an insulation condition, in this case the display pattern is not primarily determined by the display electrode pattern and there is an effect of the counter electrode pattern (the pattern of the first conductive film 9). Thus, in consideration of this effect, the electric resistance of the first conductive film 9 should preferably be less than $10^6$ Ω/□. Also, as shown in Table 2, the display life is increased with increase in the electric resistance of the first conductive film 9.

Next, a description will be made of display devices employing films of $SnO_2$ (10 K/□) as first conductive films 9 and three kinds of ITO films of different electric resistances as second conductive films 10. These parameter are shown in Table 3.

TABLE 3

| Display device | First conductive film | | Second conductive film |
|---|---|---|---|
| No. 4 | $SnO_2$ | 10 KΩ/□ | 800 Ω/□ |
| No. 5 | $SnO_2$ | 10 KΩ/□ | 100 Ω/□ |
| No. 6 | $SnO_2$ | 10 KΩ/□ | 10 Ω/□ |

A dc voltage of 1.3 V was applied to each of the three kinds of display devices and their coloration rise characteristics were examined. The rise characteristics were compared in terms of the times required for reaching 90% of the saturated coloration density. The results obtained are shown in Table 4.

TABLE 4

| Display device | Rise time |
|---|---|
| No. 4 | 15–20 sec |
| No. 5 | 10 sec |
| No. 6 | 5 sec |

Figure 8A:
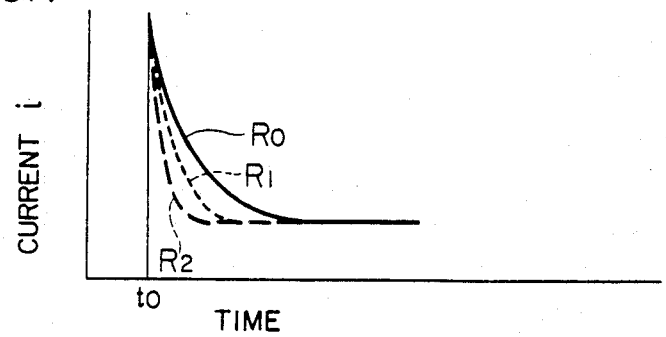
FIGS. 8A and 8B are respectively the current-time characteristic diagram and coloration density-time characteristic diagram obtained in a case where the electric resistance of the first conductive film is fixed and the electric resistance of the second conductive film is decreased gradually in the electrochromic display device of FIG. 6A.
Figure 8B:
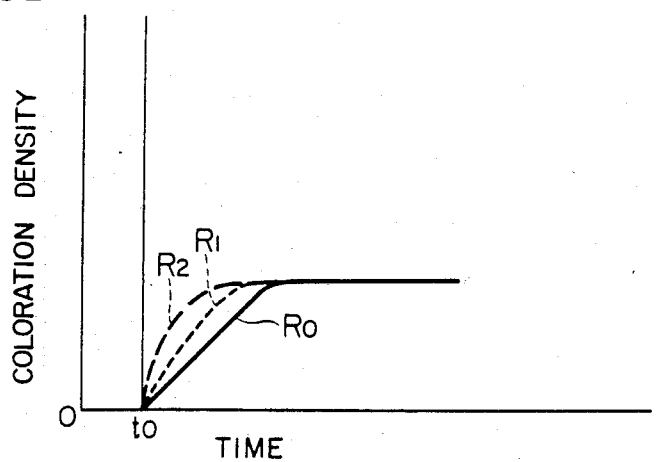

While, in these examples, the electric resistance of the first conductive film 9 was fixed and the electric resistance of the second conductive film 10 was decreased from $R'_0$ (No. 4) to $R'_1$ (No. 5) and then to $R'_2$ (No. 6), the current-time characteristic and the coloration density-time characteristic were almost unchanged. However, the response characteristics were changed as shown in FIGS. 8A and 8B.

In other words, the rise characteristic was improved with a decrease in the electric resistance of the second conductive film 10.

As the difference in electric resistance between the first and second conductive films becomes less than 10 times, the saturated coloration density is decreased and the contrast is deteriorated. Thus, from the display quality point of view, the difference in electric resistance between the first and second conductive films must be more than 10 times.

This tendency is the same when the polarity of the applied voltage is reversed with respect to the display electrode 2 and the counter electrode thereby effecting a bleaching.

Figure 9:
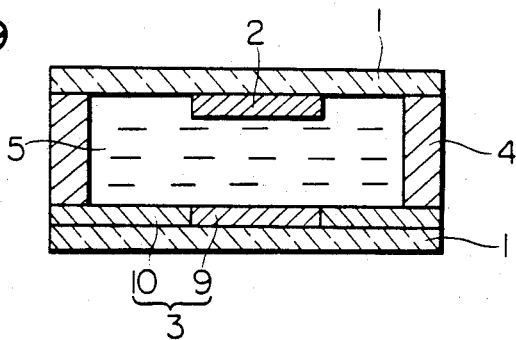
FIG. 9 is a side sectional view of an electrochromic display device according to still another embodiment of the invention.

FIG. 9 shows still another embodiment of the invention.

This embodiment is identical in construction with the embodiment of FIG. 6 except the construction of the counter electrode.

In this embodiment, the counter electrode 3 is provided by embedding the first conductive film 9 of the higher electric resistance in the second conductive film 10 of the lower electric resistance and in this case the same characteristics are obtained as the previously described embodiments.

These embodiments have the effect of increasing the electric coloration efficiency, reducing the leakage current upon the voltage application, reducing the secondary reactions (the reactions having no direct bearing on the coloration reaction) and improving the display life considerably.

In addition to $SnO_2$ and $In_2O_3$—$SnO_2$ (ITO) shown in the embodiments, the transparent electrode material for the counter electrode 3 may be any of such metal oxides as $In_2O_3$, $V_2O_5$, $TiO_2$, $InO_2$, $MoO_3$ and $WO_3$ or any composite material of two or more such metal oxides.

Figure 10:
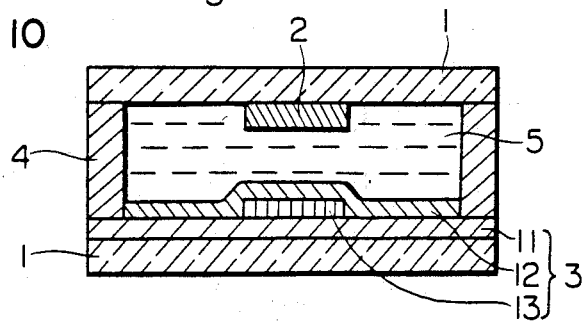
FIG. 10 is a sectional view showing an electrochromic display device according to still another embodiment of the invention.

FIG. 10 shows a sectional view of an electrochromic display device according to still another embodiment of the invention.

In the Figure, numeral 1 designates a pair of glass sheets, 2 a display electrode including a transparent electrode of $In_2O_3$, $SnO_2$ or the like, 3 a counter electrode forming a feature of this embodiment, 4 a sealing material including an epoxy resin, low melting glass or solder, 5 a display producing substance composed of a solution including an electrochromic material or a combination of an electrochromic material formed on the surface of the display electrode 2 and an electrolyte, 11 a first conductive film formed on the glass sheet 1, 13 an insulating film formed to cover the area of the first conductive film 11 facing the display electrode 2, and 12 a second conductive film formed to cover the surface of the insulating film 13 and the first conductive film 11. In this embodiment, the counter electrode 3 is formed by the first conductive film 11, the insulating film 13 and the second conductive film 12. It is to be noted that the second conductive film 12 is required to cover at least the insulating film 13 and it is not always required to cover the whole surface of the first conductive film 11. With this construction, the characteristics of the electrochromic display device feature that the coloration density rise time $t_1$ of FIG. 2B is reduced, that is, the response characteristic is improved and that corrosion due to the electrochemical reactions of the counter electrode material is reduced with the resulting improvement of the display life. While the current value $i_L$ of FIG. 2C is slightly increased by the provision of the second conductive film 12, the effect of making the current density distribution uniform is so great that the display life is still improved.

A transparent conductive film made essentially of $In_2O_3$, $In_2O_3$—$SnO_2$ or $SnO_2$ is suitable for use as the first conductive film 11 of this embodiment in view of the ease of film forming and the cost.

The preferred materials for the insulating film 13 include metal oxides (e.g., $SiO_2$ $Al_2O_3$ and $BaTiO_3$), metal fluorides (e.g., $CaF_2$ and $MgF_2$), metal nitrides (e.g., $Si_3N_4$), and the insulating film 13 should preferably be formed into the same shape as the display electrode 2. The same transparent conductive film as used for the first conductive film 11 may be used for the second conductive film 12. While there are some difficulties from the standpoint of cost and the control of metallic color by the film thickness, it is advantageous to use a noble metal such as Au, Pt or Ag in view of the stability of electrochemical reactions due to the contact with the solution, etc.

The embodiment will be described in greater detail. In the display device of the construction shown in FIG. 10, the counter electrode 3 includes the first conductive film 11 made of $In_2O_3$—$SnO_2$ of 500 Å thick, the insulating film 13 made of $SiO_2$ of 500 Å thick and the second conductive film 12 made of $In_2O_3$—$SnO_2$ of 500 Å thick. The display producing substance 5 includes the electrochromic material composed of 3,3-dimethyl-2-(P-dimethyl styryl)indolyno[2.1-b] oxazoline or one of the coloring materials of styryl analogous compounds, the supporting electrolyte composed of tetrabutyl ammonium perchlorate and the solvent composed of acetonitrile. The coloring material and the supporting electrolyte respectively have densities of 0.02 M/l and 0.1 Ml.

The following table shows a comparison of the display characteristics of the device of the above-described construction and the device shown in FIG. 1.

TABLE 5

|   | Device of FIG. 1 | Embodiment device |
|---|---|---|
| 1 Response characteristic | ~10 s | ~2 s |
| 2 Repeated coloration & bleaching life | ~5 × $10^5$ times | 3 × $10^6$ times & over |
| 3 Power consumption | 50 $\mu W/cm^2$ | 30 $\mu W/cm^2$ |

The applied voltage for coloration and bleaching purposes was 1.3 V. As will be seen from the Table, this embodiment considerably improves the response characteristic. The comparison of the response characteristics was made in terms of the time $t_1$ required for attaining the saturated density of FIG. 2B. While the density was measured at 550 nm at which the coloration absorbance is peak, the device including the insulating film showed the higher saturated density and the coloration density was increased by 2 times in terms of the absorbing constant.

The repeated life was improved by more than 10 times.

In accordance with still another embodiment of the invention there was provided a display device of the same type as the above-mentioned embodiment except that the second conductive film 12 was composed of an Au film of 300 Å and its display characteristic was examined showing that the response characteristic was improved by about 20 to 30% over the one using the $In_2O_3$—$SnO_2$ film. The other characteristics showed the same results.

It is to be noted that in the above-described embodiments both of the display element 2 and the counter electrode 3 should preferably be arranged so as to not directly contact the sealing material 4. The reason is that if they are contacted directly, the sealing material undergoes an electrochemical change and flows into the display producing substance 5 and the display life is deteriorated.

Also, the surface of the counter electrode 3 may be formed with irregularities to increase its surface area and thereby further improve the display life and the response speed.

Further, by forming a pattern on each of the display electrode 2 and the counter electrode 3, it is possibly to display different patterns in the same area.

We claim:
1. An electrochromic display device comprising
first and second substrates arranged opposite each other, at least one of said substrates being transparent;
a display electrode provided on said first substrate; and
a counter electrode having at least first and second electrically conductive films provided on said second substrate, said first film of said counter electrode facing and being directly opposite said display electrode and said second film of said counter electrode being adjacent said first film, the electrical conductivity of said first film being lower than the electrical conductivity of said second film, said first electrically conductive film having an electrical resistance of $10^6 \Omega/\square$ or less, the difference in electrical resistance between said first electrically conductive film and said second electrically conductive film being moe then ten times.

2. A device according to claim 1, wherein each of said display electrode and said counter electrode comprises transparent electrically conductive film means.

3. A device according to claim 1, wherein said counter electrode is made of a transparent electrode material, and wherein said electrode material comprises a metal oxide selected from the group consisting of $In_2O_3$, $SnO_2$, $V_2O_5$, $TiO_2$, $IrO_2$, $MoO_3$ and $WO_3$ or a composite material of two or more of said metal oxides.

4. A device according to claim 1, wherein said first film of said counter electrode is provided on said second substrate and said second film of said counter electrode is provided on a portion of said first film which is not facing and directly opposite said display electrode.

5. A device according to claim 1, which further comprises a sealing material interposed between said first substrate and said counter electrode; and a display producing substance located within a space defined by said sealing material, first substrate and display electrode, and counter electrode.

6. A device according to claim 5 wherein said display producing substance is composed of a styryl analogous compound coloring material.

7. An electrochromic display device comprising
first and second opposed substrates, at least one of said substrate being transparent;
a display electrode provided on said first substrate; and
a counter electrode provided on said second substrate, said counter electrode including a first electrically conductive film provided on said second substrate, an insulating film provided on said first conductive film opposite said display electrode and a second electrically conductive film covering said first conductive film and said insulating film.

8. A device according to claim 7, wherein each of said first and second electrically conductive films of said counter electrode is essentially composed of a material selected from the group consisting of $In_2O_3$, $In_2O_3$—$SnO_2$ and $SnO_2$.

9. A device according to claim 7, wherein said first electrically conductive film is essentially composed of a material selected from the group consisting of $In_2O_3$, $In_2O_3$—$SnO_2$ and $SnO_2$, and said second electrically conductive film is essentially composed of a material selected from the group consisting of Au, Ag and Pt.

10. A device according to claim 7, wherein said insulating film of said counter electrode is composed of a material selected from the group consisting of metal oxides, metal fluorides and metal nitrides.

11. An electrochromic display device comprising
first and second transparent substrates arranged opposite each other;
a display electrode provided on said first substrate; and
a counter electrode provided on said second substrate, each of said display and counter electrodes being composed of a transparent electrically conductive film, said counter electrode including a first area of said electrically conductive film facing and directly opposite said display electrode and a second area of said electrical conductive film adjacent said first area which is not facing and directly opposite said display electrode, the electrical resistance of said first area being higher than the electrical resistance of said second area.

12. A device according to claim 11, wherein the electric resistance of the electrically conductive film of said first area is $10^6 \Omega/\square$ or less, and wherein the difference in electric resistance between the electrically conductive films of said first and second areas is more than ten times.

13. A device according to claim 11, wherein said transparent electrode material forming said counter electrode is composed of a metal oxide selected from the group consisting of $In_2O_3$, $SnO_2$, $V_2O_5$, $TiO_2$, $IrO_2$, $MoO_3$ and $WO_3$ or a composite material of two or more of said metal oxides.

14. An electrochromic display device comprising
first and second substrates arranged opposite each other, at least one of said substrates being transparent;
a display electrode provided on said first substrate; and
a counter electrode having first and second electrically conductive films, said first film being provided on said second substrate and said second film being provided on the entire surface of said first film thereby forming a two-layer structure, the electrical conductivity of said first film being lower than the electrical conductivity of said second film.

15. An electrochromic display device comprising
first and second substrates arranged opposite each other, at least one of said substrates being transparent;
a display electrode provided on said first substrate; and
a counter electrode having an insulating film and first and second electrically conductive films, said first film being provided on said second substrate, said insulating film being provided on at least a portion of said first film opposite said display electrode, and said second film being provided over at least said insulating film, the electrical conductivity of said insulating film being lower than the electrical conductivity of said first film and the electrical conductivity of said second film being higher than that of said insulating film.

* * * * *